United States Patent [19]

Poole

[11] 3,868,605

[45] Feb. 25, 1975

[54] ADAPTABLE NOTCH FILTER

[75] Inventor: Lynn Allen Poole, State College, Pa.

[73] Assignee: The United States of America as represented by the Secretary of the Navy, Washington

[22] Filed: Nov. 15, 1973

[21] Appl. No.: 416,150

[52] U.S. Cl. ........................ 333/76, 330/109, 333/75

[51] Int. Cl. ........................ H03h 7/10, H03f 1/34

[58] Field of Search ............... 330/21, 31, 107, 109; 328/167; 333/75, 76

[56] References Cited

OTHER PUBLICATIONS

Thomas, "The Biquad: Part I – Some Practical Design Considerations," in IEEE Trans. on Circuit Theory, Vol. CT–18, No. 3, May 1971; pages 350–357.

*Primary Examiner*—James W. Lawrence
*Assistant Examiner*—Marvin Nussbaum
*Attorney, Agent, or Firm*—R. S. Sciascia; P. Schneider; W. Ellis

[57] ABSTRACT

The present invention modifies a 2-stage Biquad notch filter by adding an inverter at the input to each stage and by replacing certain of the Biquad resistors with a set of resistors in the filter circuit. The notch width, notch depth, and notch center frequency of this modified Biquad filter may now be varied independently among a set of discrete values.

5 Claims, 13 Drawing Figures

ADAPTABLE NOTCH FILTER

FIELD OF INVENTION

The present invention relates generally to electrical filters and in particular to electrical notch filters.

PRIOR ART

The narrow notch, a high-Q notch, filter has been used for years in the signal processing of signals in a reverberent or high clutter background. This high clutter background is due to echo returns from discontinuities in the transmission medium. Since these discontinuities are generally stationary, there is no doppler shift in the echo return frequency. In contra-distinction, a moving target will generally give a doppler shift to the returning echo frequency. Thus a narrow notch filter can be used to remove the unshifted center frequency at which the major clutter occurs without interferring with the target return frequencies by placing the narrow notch of the filter response at this unshifted center frequency. The ideal filter would provide a response that is the inverse of the reverberation or high clutter spectrum.

Prior art filters are non-adaptable. The notch is permanently fixed by the values of the circuit elements of the filter.

Problems arise when target-return doppler-shift is very small and thus the target-return frequency is very close to the reverberation center-frequency. In this case the frequency spreading of the reverberation overlaps the target-return frequency. Obviously, it would be very desirable to vary the width of the notch in order to reject as much clutter as possible without filtering out the target-return frequency.

A further problem occurs when the vehicle containing the sonor or radar receiving and processing equipment is moving since the reverberation center frequency will be shifted by the amount of this vehicle's velocity. The reverberation centerfrequency will then be a function of the receiving vehicle's velocity, acceloration, direction of movement and transducer beam-width. Obviously it would be desirable to be able to vary the center frequency of the notch in the filter response in order to compensate for any reverberation center-frequency shift.

Thus the non-adaptability of present notch filters limits their effectiveness due to the overlap of target signal and reverberation center frequency, due to the time varying nature of the reverberation center frequency and due to the bandwidth of the reverberation.

The present invention solves the above problems by providing an adaptive narrow-notch filter in which the notch depth, notch width, and center frequency are controlled. The adapting or controlling of the filter to generate a required filter characteristic is done without degrading the signal processed with transients generated by the control process.

SUMMARY OF INVENTION

Briefly, the present inventin utilizes newly discovered relationships between the location of the pole position and the bandwidth (notch width) and beteen the zero location and the bandwidth and notch depth to determine a set of resistor values and gain values in a filter that will vary the positions of the poles and zeros and thus vary the values of notch width, notch depth, and notch center frequency.

In one embodiment certain resistors of a Biquad notch filter are replaced by a set of selectable resistors and a switch to switch one resistor from the set of resistors into the filter circuit. An inverter is also added to the input of each Biquad section used, to provide notch depth control. These modifications provide very good notch width, notch depth, and notch frequency control.

OBJECTS OF THE INVENTION

An object of the present invention is to control independently the notch width, notch depth, and notch center frequency of a notch filter.

A further object is to control the notch in a notch filter so that it can be used with a real-time signal processor of reflected pure-tone signals in a background of clutter or reverberation.

A still further object is to give good clutter rejection for low velocity targets.

A still further object is to give good clutter rejection when the sonar or radar receiving equipment is in motion.

BRIEF DESCRIPTION OF THE DRAWING

FIG. 1-B is a plot of the low pass filter analogy.

DETAILED DESCRIPTION OF THE PREFERRED EMBODIMENT

Figures 1A, 1B:
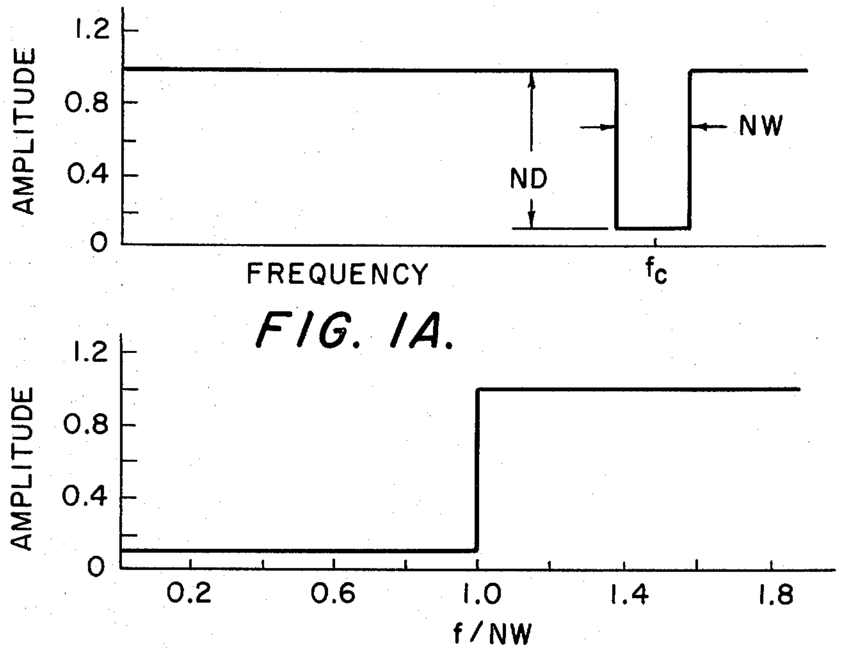
FIG. 1-A is a plot of the ideal filter response.

In order to develop a notch filter that provides a high degree of independent control of the notch, a transfer function with certain characteristics must be developed. To determine this transfer function, the ideal notch filter response was plotted in FIG. 1.

Figure 2:
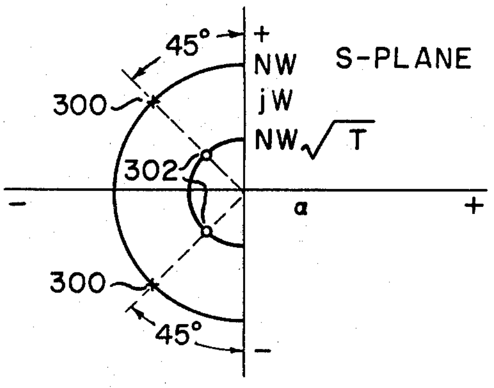
FIG. 2 is a pole-zero diagram (S-plane) for a second order Butterworth notch filter.

A second-order transfer function for it was developed from the low-pass analogy for the ideal response using the Butterworth polynomial.

$$e_o/e_{in} = \sqrt{1 + (1/T)^2 (F')^4/(1/T)^2 (1 + F'^4)}$$

where $F' = F/NW$ $F$ = the instantaneous frequency applied to the filter $F_c$ = the center frequency for the narrow notch of the filter NW = Notch width T = amplitude of the desired filter at center Frequency $F_c$ The order of the transfer function determines how closely this function comes to the ideal response. Thus, the order of the function determines the steepness of the notch. The order is completely arbitrary and a 2nd order function was picked because it has been used in the past. By plotting the poles 300 and zeroes 302 of this transfer function, it was discovered that the location of the pole position is a function of bandwidth (notch width) and the zero location is a function of bandwidth and notch depth. An S-plane diagram showing this relationship is displayed in FIG. 2.

The low-pass filter analogy was then transformed into a bandpass arrangement by translating the S-plane graph to a P-plane graph using $P = S/2 \pm\sqrt{(S/2)^2 - 1}$.

Figure 3:
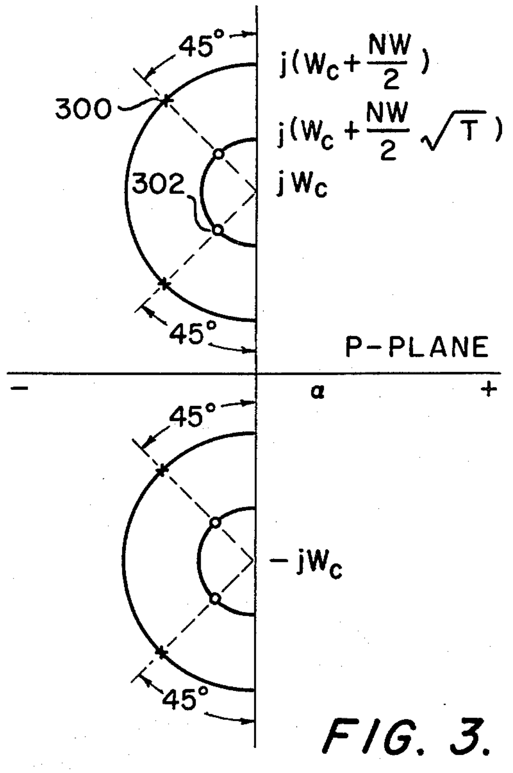
FIG. 3 is a pole-zero diagram in the P-plane for a second order Butterworth notch filter.

The P-plane plot for this 2nd order Butterworth notch filter is shown in FIG. 3. The equation for the 2nd order Butterworth voltage transfer function as determined by the pole-zero diagram of FIG. 3 is:

$$\frac{e_o}{e_{in}} = \frac{S^2+2\ [\alpha_{01}]\cdot S+[W_{01}]^2}{S^2+2\ [\alpha_{p1}]\cdot S+[W_{p1}]^2}\cdot\frac{S^2+2\ [\alpha_{02}]S+[W_{02}]^2}{S^2+2\ [\alpha_{p2}]S+[W_{p2}]^2}$$

Figure 4:
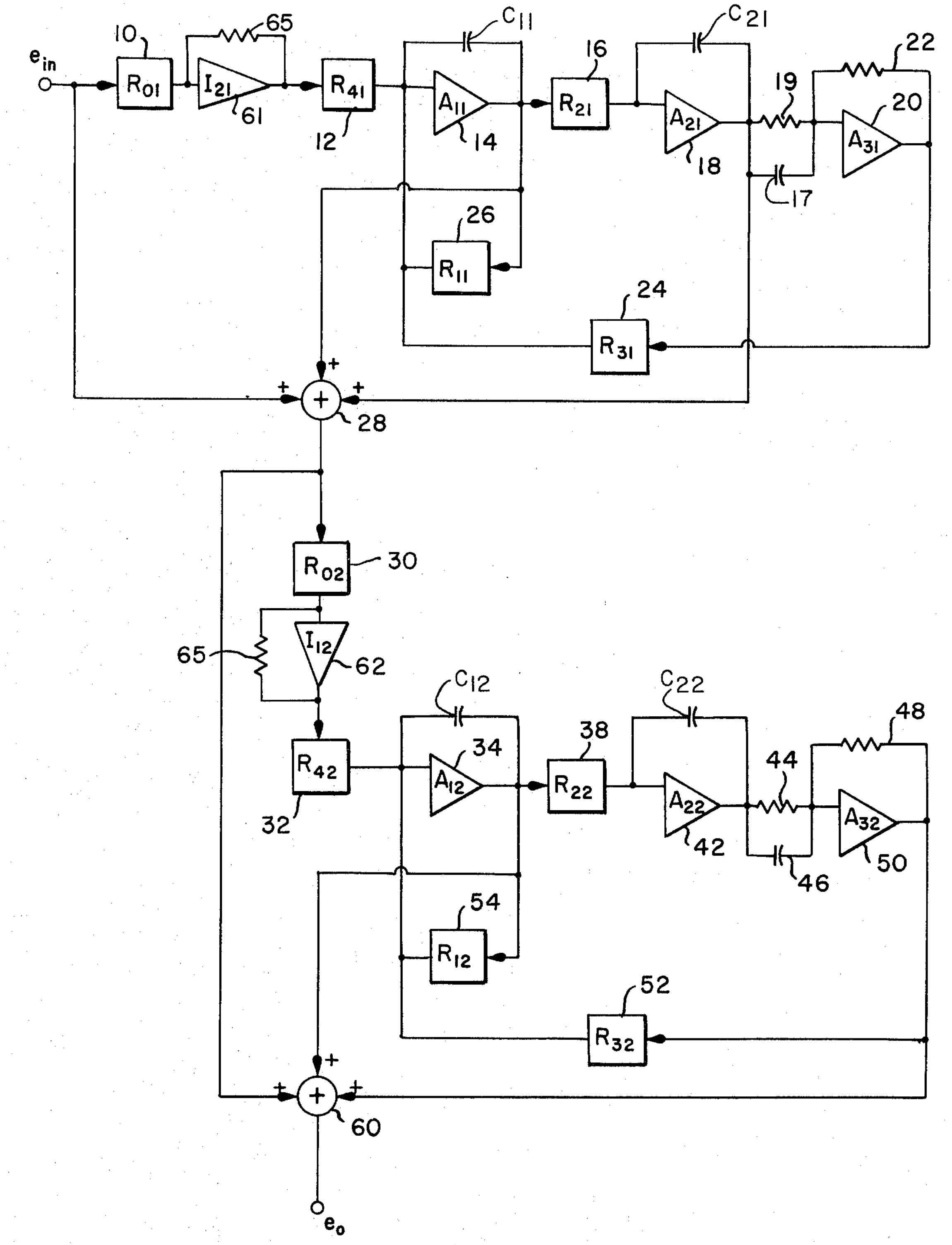
FIG. 4 is a simplified block diagram of one embodiment of the present invention.
Figure 5:
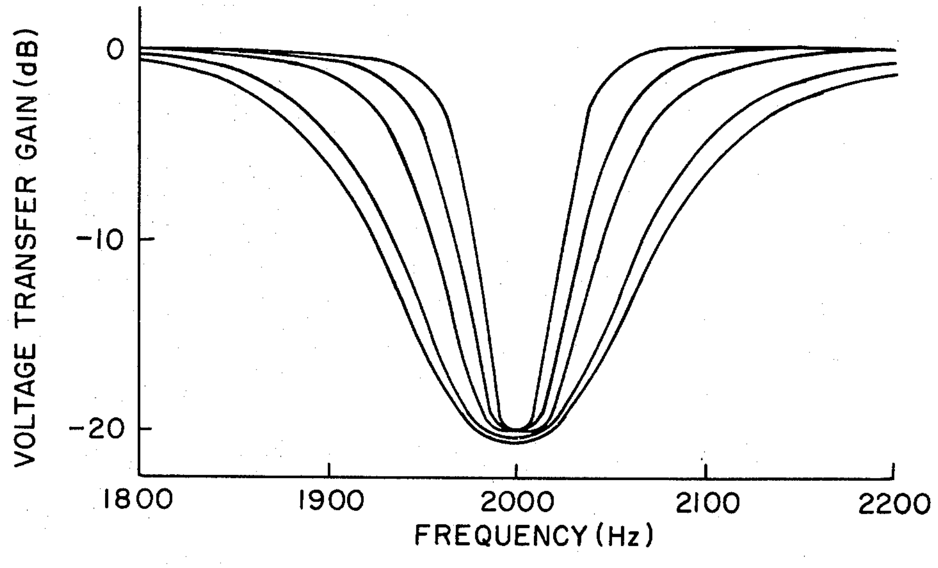
FIG. 5 is a graph illustrating notch width control of one embodiment of the present invention.

The Biquad active filter configuration was chosen for realizing this transfer function and thus implementing the relationships shown by FIGS. 4 and 5 to provide control of notch width, notch depth and center frequency. A discussion of the properties of a Biquad filter is given at IEEE Trans. Circuit Theory, Vol. CT-18, pp. 350–357, May 1971 by L. C. Thomas. The Biquad was chosen because independent control of gain, resonant frequency, and Q of the filter section was much more easily implemented than in other filters. Also the expression for the zero location on both the real and imaginery axes can be expressed as the pole location ± some constant. Thus this characteristic well permit the translation of the filters characteristic in frequency using only one variable per complex pole-zero set.

The Biquad filter design was modified slightly by the addition of an inverter to each Biquad section at the input. A selectable resistor network precedes each of these added inverters and is used to vary the inverter gain and thus vary the notch depth.

The modified Biquad voltage transfer function equals the transfer function of a set of complex pole-zero pairs for the desired notch. A single Biquad section transfer function is:

$e_o/e_{in} = (S-Z_1)(S-Z_1')/(S-P_1)(S-P_1')$ where: $Z_1 = \alpha_o + jWo$ for a zero pair.

$Z_1' = \alpha_o - jWo$ $P_1 = +\alpha_p + jWp$ for a pole pair $P_1' = +\alpha_p - jWp$ The function for a second order filter is:

$e_o/e_{in} = (S-Z_1)(S-Z_1')/(S-P_1)(S-P_1') \cdot (S-Z_2)(S-Z_2')/(S-P_2)(S-P_2')$ This transfer function can be realized by two Biquad sections: one for the $Z_1$–$P_1$ pair and one for the $Z_2$–$P_2$ pair. This configuration is shown in FIG. 4.

After a long analysis it was determined that the following equations correctly represented the system parameters of FIG. 4 in terms of notch width, notch depth, and center frequency.

1. $R_1- = \sqrt{2}/NW\ C_1-$
2. $R_4- = \sqrt{2}/C_1- \cdot 1/NW$
3. $R_3 = 1/R_2- C_1- C_2- \cdot 1/(W_c \pm NW/2\ \sqrt{2})^2$
4. Gain of inverter I = feedback resistor 65/input resistor 67 = 1 − $\sqrt{T}$
5. Transfer gain of the summers for the input from either amplifier 18 or 50 = $R_2- C_2-/4C_1-$
6. Feedback resistor 22/Input resistor 19 = 1+ ± 4 $W_c\Delta W \pm NW\Delta W \pm 2\Delta W^2/2\ W_c^2 \pm W_c\ NW + NW/4$ The dash for the second subscript of each element indicates that it applies in either one of the two Biquad sections.

NW = notch width

T = notch depth $W_c$ = notch center frequency

ΔW = change in center frequency

Although either the capacitors or the resistors can be varied, it was decided to keep the capacitors of the filter constant and vary only the resistors and amplifier gain in order to achieve control. This decision was based on the fact that variations in inductance or capacitance produce changes in the stored energy of the filter and thus enhance input independent voltage transients.

Notch-width control was realized by varying the resistors 12, 16, 24, 26, 54, 38, 52, and 32 as shown in Table 1. Table 1 was developed using Equations 1 through 6. FIG. 5 illustrates notch-width control in the Biquad filter.

Notch-depth control was realized by modifying the gains of the invertors 61 and 62. This variation of gain is accomplished by varying the ratio of the feedback resistor 65 to the input resistance to the inverters 61 and 62. This input resistance is the parallel combination of resistor 69 and one or both of the resistors 67 (FIG. 9). The resistor value determination is done by plugging in a desired notch depth into Equation 4.

Figure 6:
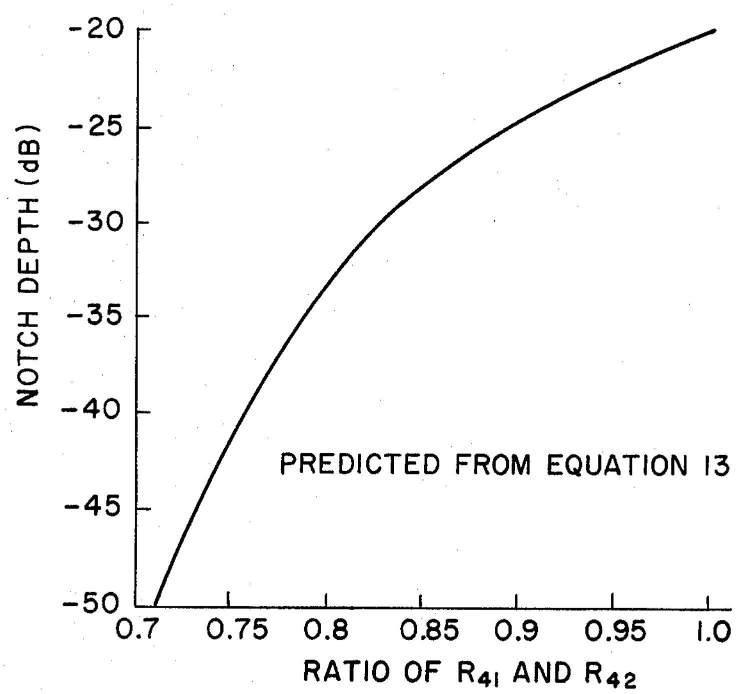
FIG. 6 is a graph of notch depth vs. the ratio of $R_{41}$ and $R_{42}$.
Figure 7:
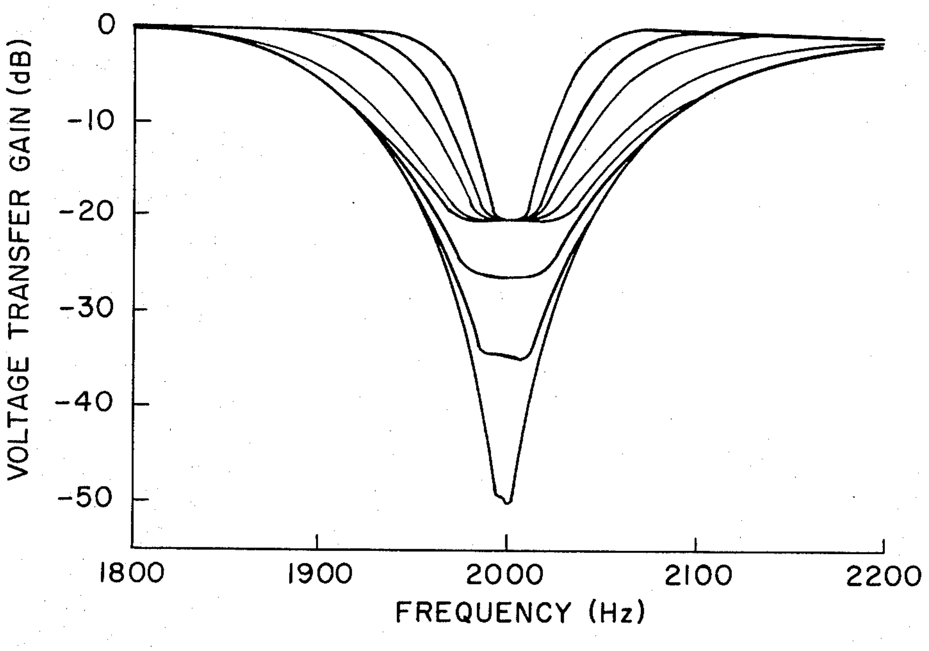
FIG. 7 is a graph illustrating the notch width and depth control of the one embodiment of the present invention.

FIG. 6 is a plot of the expected notch depth vs. variation in resistors 10 and 30. FIG. 7 illustrates notchwidth in combination with notch-depth control.

Figure 8:
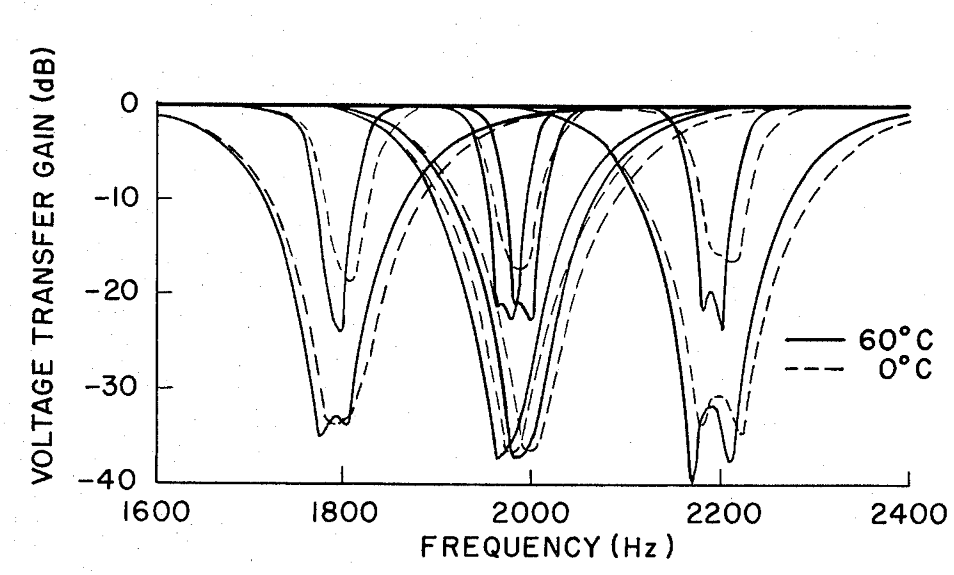
FIG. 8 is a graph notch width and depth control at several different center frequencies of the embodiment of the present invention.

Center-frequency control is realized by varying the gain of amplifiers 20 and 50. This can be done changing the ratio of the feedback resistor 22 to the input resistor 19 at amplifier 20 and the ratio of resistors 48 to 44 at amplifier 50. The values of these resistors can be simply determined by substituting the desired changes in center frequency ($W_c$) into Equation 6. FIG. 8 illustrates notch width and depth control at different center frequencies.

FIG. 9 is a schematic of one embodiment of the adaptable Biquad notch filter. The boxes of FIG. 3 are represented as dashed-line boxes.

Field-effect transistors are used to switch between the different resistors in each set. Table 2 gives the voltage values required at the F.E.T. gates to provide for switching in order to obtain the desired width, depth, and center frequency. The F.E.T.'s are biased on with a OV control signal and off with a +5V control signal.

Figure 9A:
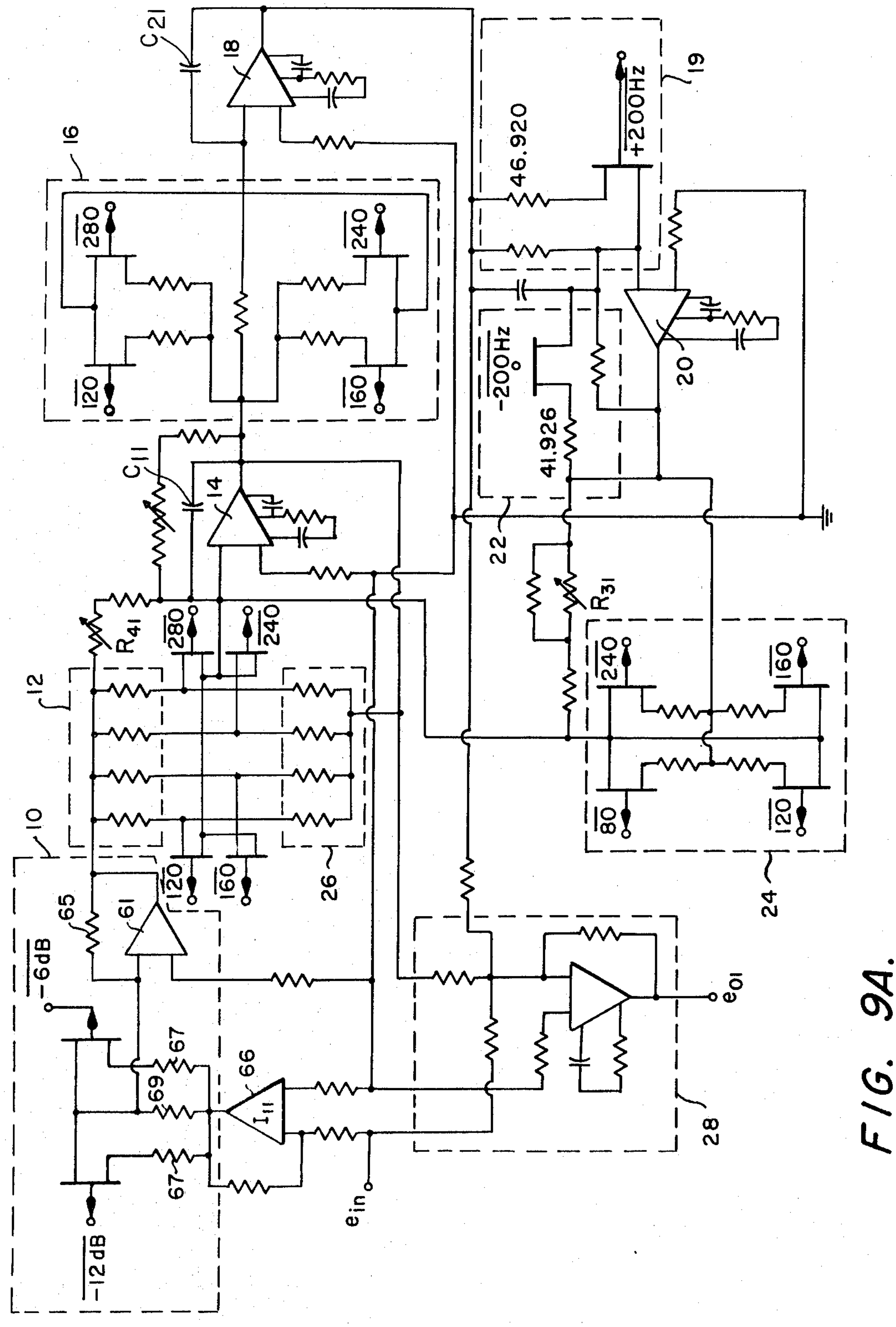
FIG. 9 is a detailed schematic diagram of the embodiment shown in FIG. 4 of the present invention.
Figure 9B:
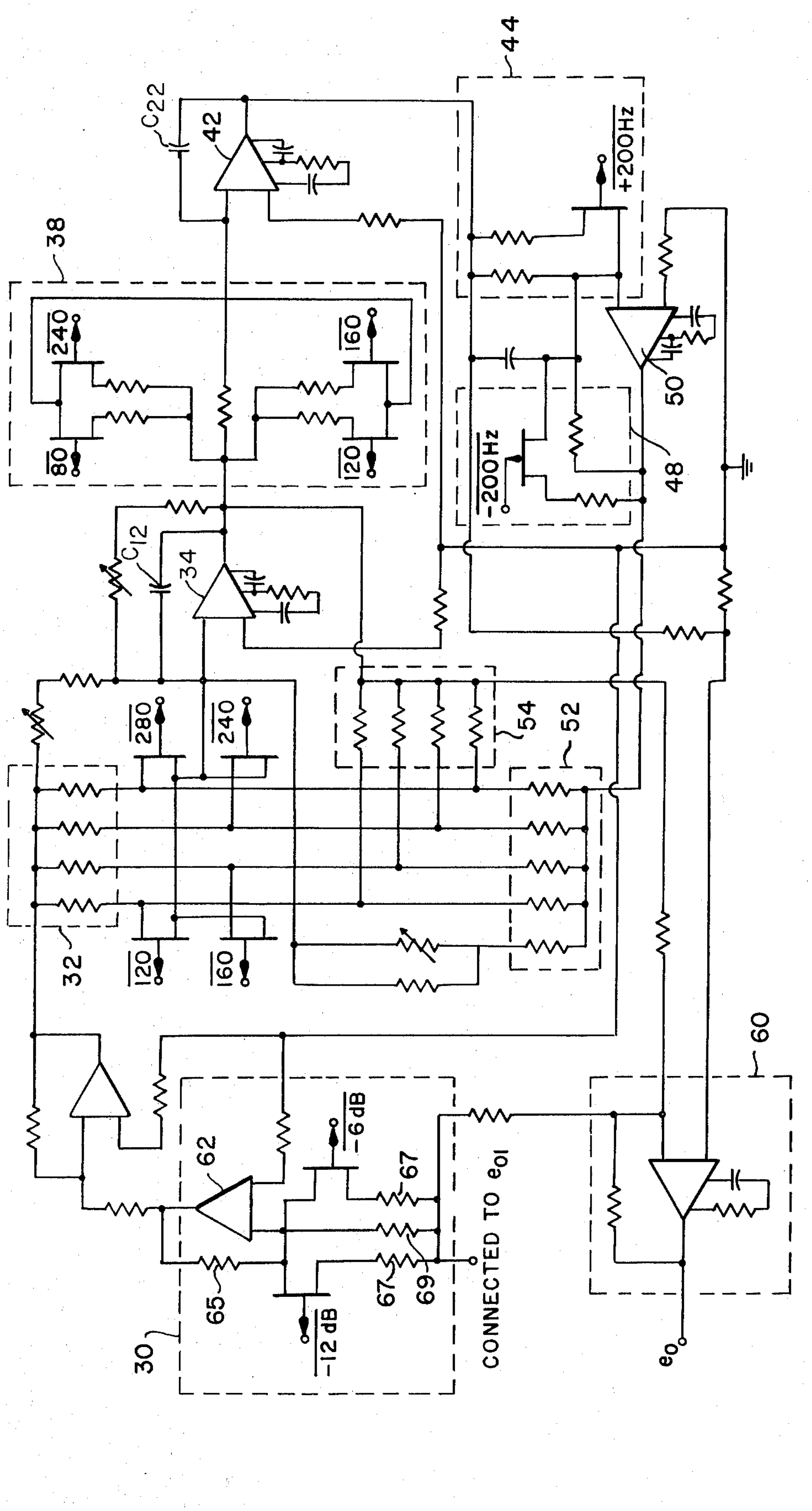

As shown in FIG. 9A, resistor networks 12 and 26 share a set of four switches. In FIG. 9B, resistor networks 32, 52, and 54 share a set of four switches.

The inverter 66 shown in FIG. 9A is merely used to make the circuit independent of input impedance. The resistors not contained within the dashed line boxes are merely biasing resistors.

The transients generated by the control circuitry for modification of the transfer function of the filter are small and short in duration.

Figure 10:
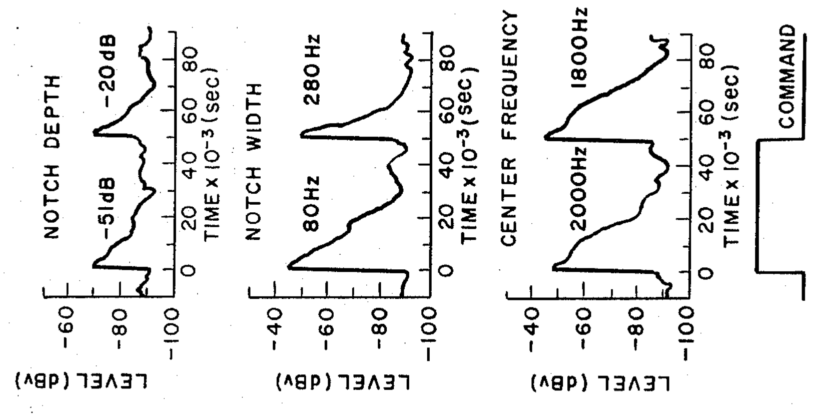
FIG. 10 is a graph illustrating the output transient response for a self-noise background.

Data for the transient response for self-noise is shown in FIG. 10. The self-noise transient was measured for command changes in notch depth, notch width, and center frequency.

Figure 11:
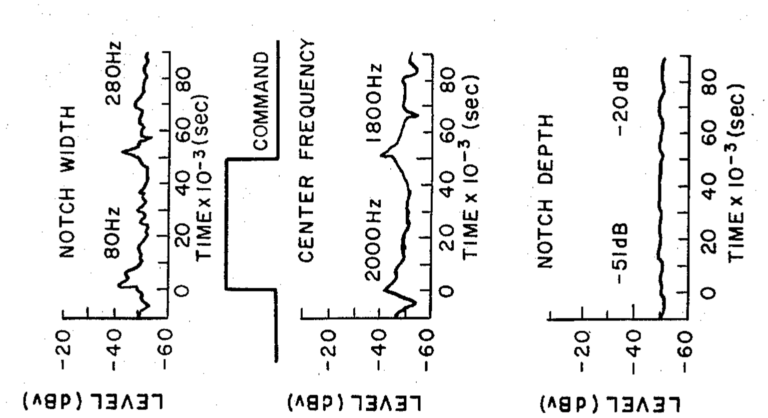
FIG. 11 is a graph illustrating the output transient for a broadband noise input.

The response with broadband input to command changes is shown in FIG. 11.

In summary, the relationships between notch width, notch depth and the pole-zero locations as shown in FIGS. 3 and 4 form the bases for the present invention. A set of design equations was developed. From these design equations a set of resistor and gain values is obtained which will independently vary locations of the pole-zero locations of the notch filter. The varying of the pole-zero locations, in turn, varies the notch width, notch depth, and notch center frequency.

TABLE 1

| NW (Hz) | RESISTOR NETWORK VALUES FOR NOTCH WIDTH CONTROL $R_{11(26)}$ | $R_{12(34)}$ | $R_{21(16)}$ | $R_{22(38)}$ | $R_{31(24)}$ | $R_{32(52)}$ | $R_{41(12)}$ | $R_{42(32)}$ |
|---|---|---|---|---|---|---|---|---|
| 80 | Adjustable | Adjustable | 3.5831 | 170.53 | 41.040 | Adjustable | Adjustable | Adjustable |
| 120 | 265.14 | 247.04 | 742.85 | 213.04 | 51.806 | 187.51 | 392.31 | 357.20 |
| 160 | 133.55 | 122.68 | 366.61 | 292.47 | 70.010 | 93.321 | 198.09 | 177.14 |
| 240 | 67.777 | 60.519 | 182.10 | 884.68 | 224.10 | 46.371 | 101.04 | 87.034 |
| 280 | 53.978 | 48.609 | 146.24 | 3.7311 | Adjustable | 37.299 | 80.344 | 69.990 |

All resistance in $10^3$ ohms

TABLE 2

| NOTCH WIDTH | CONTROL SIGNALS Control Signals (voltage) 80 | 120 | 160 | 240 | 280 |
|---|---|---|---|---|---|
| 80 cycles | OV | +5V | +5V | +5V | +5V |
| 120 | +5V | OV | +5V | +5V | +5V |
| 160 | +5V | +5V | OV | +5V | +5V |
| 240 | +5V | +5V | +5V | OV | +5V |
| 280 | +5V | +5V | +5V | +5V | OV |

| CENTER FREQUENCY | +200 | −200 |
|---|---|---|
| 1800 Hz | +5V | OV |
| 1955 Hz | OV | OV |
| 2000 Hz | +5V | +5V |
| 2200 Hz | OV | +5V |

| NOTCH DEPTH | −6 | −12 |
|---|---|---|
| −20 dB | +5V | +5V |
| −26 dB | OV | +5V |
| −32 dB | +5V | OV |
| <−32 dB | OV | OV |

What is claimed is:

1. An adaptable Biquad notch filter comprising at least two identical filter sections wherein each of the sections comprises:

first resistor network means (10) to which an input signal is applied;

inverter means (I) taking an input from said first resistor network;

second resistor network means (12) taking an input from said inverter means;

first amplifier means (14) taking an input from said second resistor network;

third resistor network means (16) taking an input from said first amplifier means;

second amplifier means (18) taking an input from said third resistor network;

third amplifier means (20) taking an input from said second amplifier means;

fourth resistor network means (19 and 22) comprising two sets of resistors, said first set of resistors connected as a feedback resistor around said third amplifier means, said second set of resistors connected between the output from said second amplifier means and the input to said third amplifier means;

fifth resistor network means (24) taking an input from said third amplifier means and applyings its output to the input of said first amplifier means;

sixth resistor network means connected to the output from said fifth resistor network and to the output from said first amplifier means;

summer means taking as inputs the input signal, the output from said second amplifier means, and the output from said first amplifier means, said summer means of the first filter section applying its output as the input signal to an inverter means of the next filter section, said summer means of the last filter section applying its output signal as the notch filter output;

each of said resistor networks comprising:

a plurality of selectable resistors, a switch means for effectively selecting one of said plurality of resistors as a transmission path to filter the input signal of the network in a desired manner so that notch width, notch depth, and notch center frequency may be varied.

2. An adjustable Biquad notch filter as in claim 1 wherein said first and second amplifier means further comprise a feedback capacitor connected between the input and output of each of the aforesaid amplifiers' in both the first and the second filter sections, and wherein said third amplifier means further comprises a resistor and capacitor in parallel connection with each other and connected between the input to said third amplifier means and the output of said second amplifier means.

3. An adjustable Biquad notch filter as in claim 2 wherein said switch means is a field-effect transistor.

4. An adaptable Biquad notch filter as in claim 2 wherein said first resistor network means comprises:

feedback resistor means connected at the input and output of said inverter means;

wherein said plurality of selectable resistors of said first resistor network means are connected such that one of the resistors of said plurality of selectable resistors is the input resistor through which the input signal is applied to said inverter means.

5. An adaptable Biquad notch filter as in claim 4 wherein the following equations are used to determine each resistor value in said plurality of selectable resistors for said first, said second, said third, said fourth, said fifth, and said sixth resistor network means:

R sixth network = $\sqrt{2}/N.W.\ C_{A1}$;

R second network = $\sqrt{2}/C_{A1} \cdot 1/N.W.$; ;

R fifth network = $1/(R \text{ third network})(C_{A1})(C_{A2}) \cdot 1/(W_c + N.W./2\sqrt{2})^2$;

Transfer gain of said summer means for the input from said second amplifier means = $(R \text{ third network})(C_{A2})/4(C_{A1})$ R fourth network feedback resistor/R fourth network input resistor = $1 + \pm 4W_c\Delta W \pm N.W.\Delta W + 2(\Delta W)^2/2W_c^2 \pm W_c N.W. + N.W./4$;

Gain of inverter = R first network feedback resistor/R first network input resistance = $1 - \sqrt{T}$ N. W. = notch width $C_{A1}$ = Feedback capacitor for said first amplifier means T = notch depth $C_{A2}$ = feedback capacitor for said second amplifier means $W_c$ = notch center frequency $\Delta W$ = a desired change in center frequency.

* * * * *